May 10, 1960  N. B. WILLIAMSON  2,936,182
LINKAGE FOR PARALLEL MOTION
Filed Nov. 1, 1956  2 Sheets-Sheet 1
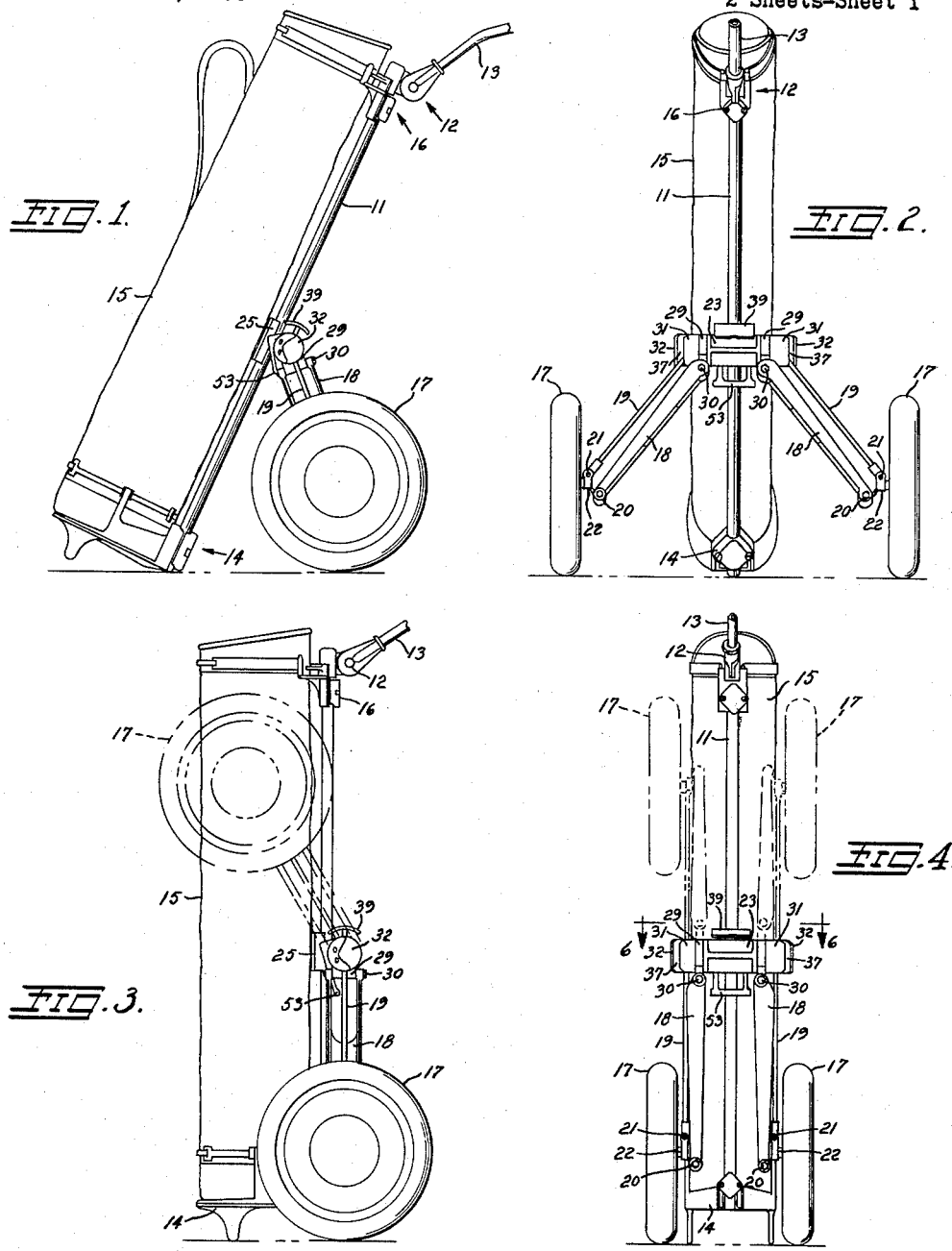
INVENTOR
Norman B. Williamson
BY
AGENT May 10, 1960 N. B. WILLIAMSON 2,936,182
LINKAGE FOR PARALLEL MOTION
Filed Nov. 1, 1956 2 Sheets-Sheet 2
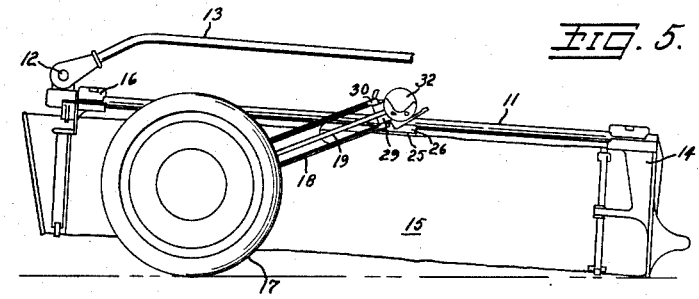
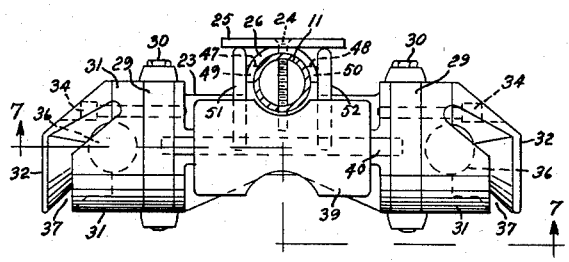
INVENTOR
Norman B. Williamson
BY
AGENT United States Patent Office 2,936,182
Patented May 10, 1960

2,936,182

LINKAGE FOR PARALLEL MOTION

Norman B. Williamson, Portland, Oreg., assignor to Jarman-Williamson Company, Portland, Oreg., a partnership Application November 1, 1956, Serial No. 619,792

12 Claims. (Cl. 280—41)

This invention relates generally to mechanical linkages adapted for the simultaneous three dimensional translation of an axis of rotation between multiple parallel positions of the axis.

More particularly this invention relates to means for moving a supported device having a reference plane between spaced limit positions in the reference plane and an intermediate position in a plane spaced parallel to the reference plane.

In the form here disclosed as a preferred mode of practicing my invention there is shown a two wheeled golf bag cart on which each of the wheels is supported to be selectively detained in one of a pair of spaced positions of storage in a plane or an intermediate position of use in another plane.

It should be understood that there are three separate and distinct conditions by which the usefulness of a golf bag cart is determined. The first condition of course is its adaption to its purpose of use on the golf course. The second condition is its adaption to being conveniently stored in the caddy house of a golf or country club. The third condition is its adaption to being conveniently folded and carried or put in the trunk of an automobile. All of the prior art golf carts known to me are capable of reasonably advantageous use during the play on the golf course but as far as known none of the prior art carts differentiate between the two requirements of the cart when folded. In other words, the prior art carts have a single folded position of the wheels, with some of them better adapted for carrying in the folded position while some are better adapted for upright storage in the caddy house.

It is a principal object of the present invention to provide a golf cart adapted for convenient positioning and detaining of the wheels in any selected one of three positions, i.e. a position of use on the golf course, a position best adapted for carrying or horizontal storage and a position best adapted for upright storage and wheeling into a position of storage.

It is a second object to provide such a golf cart with mechanism adapted for convenient positioning and detaining of the wheels in any selected one of at least three positions.

It is a third object to provide such a golf cart with a three position mechanism adapted latchably to detain a wheel thereof in a selected one of a plurality of positions.

It is a fourth object to provide such a golf cart with a multi-position mechanism adapted to bias a wheel thereof towards a selected one of several positions when the wheel has first been placed in that position.

It is a fifth object to provide such a golf cart with a multi-position mechanism adapted latchably to detain a wheel thereof in a selected one of several positions together with manually operable unlatching means adapted to release the wheel from said selected one of the several positions for gravitational movement to another of said several positions.

How these and other objects are attained are explained in the following description referring to the attached drawings in which Fig. 1 is a view in side elevation of a golf bag cart made in accordance with the teaching of this invention.

Fig. 2 is a view in rear elevation of the golf bag cart of Fig. 1.

Fig. 3 is a view in side elevation of the golf bag cart of Fig. 1 but with the wheels folded to a position of storage of the bag in upright position.

Fig. 4 is a view in rear elevation of the golf bag cart of Fig. 3.

Fig. 5 is a view in side elevation of the golf bag cart of Figs. 1 to 4 but in horizontal storage position with the wheels folded to their positions shown in broken lines in Figs. 3 and 4.

Fig. 6 is a plan sectional view along the line 6—6 of Fig. 4.

Fig. 7 is a fragmental rear elevation view in partial section along the line 7—7 of Fig. 6.

Fig. 8 is a fragmentary side elevation view in partial section along the line 8—8 of Fig. 7.

Fig. 9 is a fragmental side elevation view in partial section along the line 9—9 of Fig. 7.

Like numerals of reference refer to like parts in the several figures of the drawings.

Referring now to the drawings there is shown a golf bag cart having a spine 11 hinged at its upper end, as shown at 12, to handle 13 and adapted to support bag 15 on base 14. Bag 15 is secured at its upper end to spine 11 as shown at 16. Wheels 17 are supported on parallelogram systems having rigid guiding arms 18 and laterally resilient spring arms 19 secured at 20 and 21 respectively to heads 22 of the axles on which wheels 17 are rotatably secured.

The essential novelty and great utility of my invention resides in the means for supporting and positioning the wheel arms 18, 19 on the spine 11.

Base block 23 (see Figs. 6 and 9) is secured on spine 11 by two vertically spaced headed screws 24 threaded into base block 23 after passing through holes formed as required in plate 25, clamp 26 and spine 11. At its outer ends, the base block 23 is reduced in diameter to form radial faces 27 and cylindrical faces 28 respectively to abut and rotatably support hinge ring 29 to which arms 18 are hingedly supported at 30. Rings 29 are restrained from excessive movement away from faces 27 of base block 23 by socket blocks 31 secured to base block 23 by cam blocks 32 and screws 34 threaded into the ends of base block 23 after passing through holes formed for the purpose in socket blocks 31 and cam blocks 32.

It is to be noted that unless otherwise restrained rings 29 would be free for unlimited rotation about surfaces 28. But wheel arms 18 are hinged to rings 29 and wheel arms 19 are formed with spherical ends 35 rotatably secured in spherical sockets 36 formed of mating halves in each of blocks 31 and 32. Also blocks 31, 32 are formed with spaced facing cam surfaces to form cam slots 37 adapted axially to guide the swing of arms 19 as wheels 17 are rotated about block 23 on arms 18 and rings 29.

The limits of rotation of arms 29 in slots 37 are particularly shown in Figs. 3, 4 and 5 to be in one direction to the wheel position shown in Fig. 5 or in broken lines in Figs. 3 and 4 and in the other direction to the wheel position shown in Figs. 3 and 4. Also as shown in Figs. 4, 6 and 7 it is seen that slots 37 are so formed that when arms 19 are at either of the limit positions of slots 37 the arms 19 are in planes parallel to a fore and aft vertical plane through the centerline of spine 11 so that the wheels will lie close to the bag and the cart will require a minimum of lateral space when not in use.

Again, cam slots 37 are seen to be so formed that at a position of arms 19 intermediate the limit positions shown in Fig. 3 and Fig. 5, arms 18 and rings 29 as well as wheels 17 will be angularly positioned about block 23 as shown in Fig. 1 and laterally rotatably positioned about hinge positions 30 by arms 19 guided in slots 37 to the widest lateral wheel spacing positions shown in Fig. 2. These wheel positions of wide wheel spacing are the wheel positions desired when the cart is in use on the golf course.

To detain the cart wheels in any of the three desired positions, Figs. 6 to 9, a longitudinal radial slot 38 is sunk into the top of base block 23 slidably to receive vertical leg 40 of detent 39 biased upwardly by springs 41 guided as shown in holes sunk for the purpose in the bottom of slot 38. In Fig. 7 it is seen that at its ends leg 40 of detent 39 is reduced in radial height to something less than the depth of slot 38 below the bearing surfaces 28 of block 23 on which rings 29 rotate.

As shown in Figs. 7 and 8, slot 38 extends longitudinally in base block 23 to underlie the inward sides of hinge rings 29. Also the inside diameter surfaces of hinge rings 29 have sunk outwardly therein three slots 42, 43 and 44 for the purpose of receiving vertical leg 40 of detent 39 when the wheels 17 and hinge rings 29 are in the positions shown in Figs. 3, 1 and 5 respectively. Thus when wheels 17 and hinge rings 29 are rotated about the axis of base block 23 the ends of leg 40 of detent 39 biased outwardly by springs 41 will move outwardly and enter the first ones of slots 42, 43 or 44 which override the ends of leg 40 and wheels 17 will be detained in that position until rings 29 are released from detent 39 by downward pressure on detent 39 sufficient to overcome the bias of springs 41.

It is to be noticed that slots 43 which determine the use position of wheels 17 and rings 29 with respect to block 23 have substantially parallel sides so that when detent 39 is engaged by slots 43 rings 29 are fixed against rotation in either direction. If desired slots 42 and 44 could have the same shape as slots 43 but in this form of the practice of my invention I prefer to provide slots 42 and 44 with one side cam faces 45 and 46 respectively so that wheels 17 may be returned from either of the storage opsitions of Figs. 3 and 5 to the use position of Fig. 1 by a sufficient pull on wheels 17 to run the ends of detent 39 down the cam faces 45 or 46 of slots 42 or 44 respectively. Thus it is necessary to depress detent 39 to move wheels 17 away from their position shown in Fig. 1 but from any other positions the wheels may be moved towards their position shown in Fig. 1 without manual movement of detent 39. However cam faces 45 and 46 are steep enough to give the useful restraint desired to oppose movement of wheels 17 away from their positions shown in Figs. 3 and 5.

It is within the teaching of my present disclosure to provide cam slots 37 with any desired shape to give wheels 17 any desired position axially of block 23 at any desired angular position of rotation of hinge rings 29 about the axis of block 23. Also the number of detaining slots in rings 29 and the shapes thereof is a matter to be elected within the teaching hereof.

Not required for the successful operation of the disclosed golf bag cart but as an additional operating convenience, I have provided a pedal for an alternate way to manipulate detent 39. As shown in Figs. 6, 7 and 9, clamp 26, used to clamp spine 11 to base block 23 is formed with aligned slots 47 and 48 into which are rotatably secured against the outer surface of block 23 the inwardly facing axially aligned stub journals 49, 50 of bell cranks 51, 52 secured together at one end by pedal bar 53. The other or free ends of bell cranks 51, 52 are inserted through holes 54, 55 formed in leg 40 of detent 39. As will be understood from Fig. 9 when pedal 53 is moved towards spline 11 bell cranks 51, 52 will rotate clockwise about journals 49, 50 and the free ends of bell cranks 51, 52 will move detent 39 downward against the bias of springs 41 to release rings 29 for rotation about block 23.

A feature of the form in which my invention is here shown is the length of detent 39 rockably supported on longitudinally spaced springs 41. With this arrangement it is seen that detent 39 can be depressed at either of its lateral ends to release for rotation only the ring 29 at that end. Or if it is desired to release both rings 29 for rotation at the same time detent 39 can be pressed down manually near its mid lentgh to compress springs 41 equally or detent 39 can be depressed equally at both ends by pressing pedal 53.

These varied arrangements for releasing detent 39 add to the convenience of operation as will be explained. Thus, assuming that the golf cart is in the storage position of Fig. 5, when the owner wishes to use the cart he will pick the cart up by the folded down handle 13 and stand it up on its base 14. He will then pull one wheel at a time rearwardly out of its position of engagement of detent 39 with its respective ring slot 44 of its ring 29 and the wheel will fall by gravity turning its ring 29 until its slot 43 is engaged by detent 39 and the wheels are locked in the positions shown in Figs. 1 and 2. Handle 13 is then positioned around hinge 12 so that at the normal elevation of the handle in the hand of the user, wheel arms 18 and 19 will be substantially vertical as seen from the side and the resiliency of spring arm 19 will have its maximum usefulness.

As previously noted, arms 19 are formed of laterally resilient material. When rings 29 are prevented from rotation about block 23 by the engagement of detent 39 in both block 23 and rings 29, arms 19 are prevented from rotation about their ball ends 35 on axes parallel to hinge pins 21 by the cam faces of slots 37. However, arms 18 are free to move about pins 20 and 30 so that arms 19 become cart supporting springs cantilevered from their respective slots 37.

When the user is through with the cart and wishes to return it to its position of storage shown in Fig. 5 he will first return the handle 13 to its folded down position then step on one end of detent 39 to release the wheel on that side, pick up the wheel and rotate it until detent 39 latches on that end in ring slot 44. Then stepping on the other end of detent 39 the other wheel is released for rotation to its similar position with its end of detent 39 engaged in its ring slot 44. The cart can then be laid over into its Fig. 5 storage position.

If the cart is stored upright as shown in Figs. 3 and 4, it can be taken by the handle with the wheels remaining in the positions shown in Figs. 3 and 4 and rolled on its wheels into the open where there is more room. Then the wheels may be pulled one at a time from their positions of engagement of their ends of detent 39 with their respective ring slots 42 to their positions of engagement of detent 39 with their respective ring slots 43 where the wheels will be locked in position for use in the game.

After the game to restore the cart to its desired condition of upright storage the user merely tips the cart ahead to a position of rest on base 14 and with wheels 17 lifted off the ground. Then by pressing pedal 53 detent 39 is withdrawn simultaneously from slots 43 of both wheel rings 29 and both wheels 17 will drop by gravity until detent 39 engages both slots 42 of both wheel rings 29 of both wheels 17.

Having thus recited some of the objects of my invention, illustrated and described a preferred form in which my invention may be practiced and explained its operation, I claim:

1. A two wheeled golf cart comprising a golf bag supporting frame, a pair of parallel wheel axles, a pair of wheels rotatably secured respectively on said axles, a base block fixed to said frame, a pair of supporting means each adapted independently to support a respective one of said wheel axles on said base block for rotation of said support means about a base block axis parallel to said wheel axles together with means for simultaneous translation of said respective one of said wheel axles in its axial direction.

2. A two wheeled golf cart comprising a golf bag supporting frame, a pair of parallel wheel axles, a pair of wheels rotatably secured respectively on said axles, a base block fixed to said frame and a pair of supporting means for supporting said wheel axles respectively independently on said base block, one of said pair of supporting means comprising a first arm, a second arm having the same linkage length as said first arm and parallel thereto, a hinge ring, means supporting said hinge ring on said base block for rotary movement only about said base block axis, means hingedly securing the respective ends of said first arm to said hinge ring and said respective one of said wheel axles for rotary movement about parallel first and second hinge axes, means hingedly securing one end of said second arm to said respective one of said wheel axles for rotary movement about a third hinge axis parallel to said first and second hinge axes, a spherical end secured on the other end of said second arm, socket means secured to said base block forming a spherical socket securing said spherical end of said second arm to said base block on said base block axis for three dimensional movement about the center of said socket, said socket means being formed with a cam slot radiating from the center of said socket to the outer surface of said socket means, said cam slot extending circumferentially in said socket means about said base block axis with varying axial angularity thereto, said cam slot being adapted to receive said second arm adjacent its said spherical end and control the axial angular motion of said second arm with respect to said base block axis as said hinge ring is rotated circumferentially about said base block axis, whereby said one of said wheel axles will be rotated about said base block axis and simultaneously translated in its axial direction as said hinge ring is rotated and said arms hold said wheel axle parallel with said base block axis.

3. The golf cart of claim 2 including detent means movably carried on said base block axis for engaging said hinge ring as desired to lock said hinge ring in a selected one of a plurality of angular positions about said base block axis to hold said wheel axle in a desired position circumferentially of said base block axis.

4. The golf cart of claim 2 including a plurality of detent slots formed on said hinge ring and spaced circumferentially thereabout, a cooperating detent bar carried on said base block adjacent said hinge ring and means biasing said bar towards entry into any one of said slots as said any one of said slots is juxtaposed with said bar on rotation of said hinge ring about said base block axis.

5. The golf cart of claim 4 in which the other ones of said pair of wheels and wheel axles are supported on said base block by the other of said supporting means, said other of said supporting means being formed with parts having mirror symmetry about the fore and aft vertical center-plane of said frame with the one of said supporting means, and said detent bar is carried on said base block with one end cooperating with one of said hinge rings and the other end cooperating with the other of said hinge rings, said detent bar being tippable against its biasing means to release one of said hinge rings at a time or both of said hinge rings at the same time.

6. The golf cart of claim 5 including pedal means for operating said detent bar to release both of said hinge rings at the same time.

7. A two wheeled golf cart comprising a golf bag supporting frame, a pair of wheel axles, a pair of wheels rotatably supported respectively on said wheel axles, a base block fixed to said frame having a base block axis in parallelism with said wheel axles and a pair of supporting means each adapted independently to support a respective one of said wheel axles rotatably on said base block about said base block axis, each of said pair of supporting means including a hinge ring secured on said base block for rotary movement about said base block axis, a rigid wheel arm hinged at one end to said hinge ring and at the other end to one of said wheel axles for hinging movement in a plane including the axis of said one of said wheel axles and said base block axis, a resilient wheel arm hinged at one end to said one of said wheel axles for movement in said plane and pivoted at its other end for universal movement about a point on said base block axis in said plane, said rigid and said resilient wheel arms being parallel with equal linkage lengths and movable only with their axes in said plane and said base block including cam means for angularly guiding said resilient wheel arm with respect to said base block to maintain a desired angularity between the axis of said resilient wheel arm and the axis of said base block in said plane as said wheel arm is rotated about said axis of said base block.

8. A two wheeled golf cart comprising a golf bag supporting frame, a pair of parallel wheel axles, a pair of wheels rotatably secured respectively on said wheel axles, a base block secured to said frame, said base block having an axis parallel to said wheel axles, a pair of supporting means each adapted independently to support a respective one of said wheel axles on said base block for rotation of said supporting means about said base block axis with simultaneous translation of said respective one of said wheel axles in both the radial and axial directions of said base block axis, each of said supporting means comprising a pair of parallel arms of equal length, means hinging the adjacent ends of one pair of said parallel arms on respective first and second arm axles on one of said wheel axles and means supporting the other pair of adjacent ends of said parallel arms on said base block for rotary movement of said parallel arms about respective additional arm axes parallel to said arm axles and simultaneous rotary movement of said parallel arms about said base block axis.

9. A golf cart including a linkage for parallel motion in three directions, said golf cart including a wheel axle, a pair of equal length parallel supporting arms for said wheel axle, means hinging the first pair of adjacent ends of said supporting arms on first and second spaced parallel support axles on said wheel axle, a base block having a base block axle formed thereon, a hinge ring rotatably carried on said base block axle, means hinging the second end of one of said supporting arms to said hinge ring on a third support axle parallel to said first and second support axles and means pivoting the second end of the other of said supporting arms on said base block for three directional pivotal movement of said other of said supporting arms about a point on the axis of said base block, said supporting arms forming two equal length opposite sides of said linkage for parallel motion, one of the remaining two equal length parallel sides of said linkage being formed by said wheel axle between said first and second support axles and the other of the remaining two equal length parallel sides of said linkages being formed by said base block and said hinge ring between the respective hinge and pivot positions of said second ends of said pair of supporting arms.

10. The golf cart of claim 9 in which said means for pivoting the second end of the other of said supporting arms includes cam means secured on said base block for guiding said other one of said support arms longitudinally angularly with respect to said axis of said base block axle as a predetermined function of angular rotation of said hinge ring about said base block axle.

11. The golf cart of claim 10 including a detent movably carried on said base block for engagement with a detent socket formed on said hinge ring, said socket being positioned on said hinge ring to fix said hinge ring to said base block to retain said wheel axle at a desired three directional position with respect to said base block.

12. A two wheeled golf cart including a frame, a pair of parallel wheel axles, a pair of wheels rotatably supported respectively on said wheel axles, a pair of respective support means for positionably supporting the respective ones of said wheel axles on said frame, each of said support means including a base block secured to said frame, said base block having an axis parallel with said wheel axles, a pair of parallel support arms, a pair of spaced parallel arm axles respectively hinging one pair of adjacent ends of said arms to one of said wheel axles for movement of said arms in a plane and means securing the other pair of adjacent ends of said arms to said base block rotatably about the axis thereof and rotatably about spaced parallel respective arm axes parallel to said arm axles whereby said wheel axles will be individually three directionally positionable.

References Cited in the file of this patent

UNITED STATES PATENTS

| | | |
|---|---|---|
| 2,523,893 | Williamson | Sept. 26, 1950 |
| 2,564,828 | Alexander | Aug. 21, 1951 |
| 2,597,386 | Schmid | May 20, 1952 |
| 2,598,046 | Frey | May 27, 1952 |
| 2,610,864 | Alexander | Sept. 16, 1952 |
| 2,679,402 | Sawyer | May 25, 1954 |
| 2,718,406 | Sawyer | Sept. 20, 1955 |